United States Patent Office 3,285,849
Patented Nov. 15, 1966

3,285,849
PROCESS FOR COAGULATING AQUEOUS SUSPENSIONS AND COMPOSITION FOR USE THEREIN
Hiroshi Watanabe, Hideo Matsunaga, and Masao Inoue, all of Kamakura, Kanagawa, Japan, assignors to Toyo Koatsu Industries, Inc., Tokyo, Japan, a corporation of Japan
No Drawing. Filed Aug. 10, 1962, Ser. No. 216,065
11 Claims. (Cl. 210—52)

The present invention relates to a process for rapidly coagulating minute particles suspended in water by adding compounds which are polymerization products of polysaccharides or the derivatives thereof and a nitrogen-containing resin, e.g., urea resins, melamine resins or the copolymers thereof, with inorganic salts to the aqueous suspension.

To accelerate precipitation of minute particles suspended in water, such substances as starches, glues and vegetable gums have hitherto been employed. However, the use of these substances is disadvantageous in that they lack ease of handling, the majority of them function only within a certain restricted range of pH and their coagulating effect is only moderate.

The polysaccharides or the derivatives thereof employed in the present invention include the starches derived from potatoes, sweet potatoes, corns, wheats, tapiocas, etc., the oxidized starches thereof, glycogen, inulin, cellulose, chitin, hemicellulose, pectin, vegetables, gum, etc., and the modified polysaccharides produced by substitution of at least 4% of the OH radicals contained in the above-mentioned polysaccharides with $OCH_2OH$, $OR$, $OAc$, $OCH_2COOR$, $OCH_2CH_2OR$, $OCH_2CH_2CONH_2$, $OCH_2OCH_2CH_2CN$, $OCH_2OCH_2CH_2CONH_2$, or
$$OCH_2CH_2CN$$
radicals in addition to the modified polysaccharides wherein at least 1% of any $OCH_2CH_2CN$ or $OCH_2CH_2CONH_2$ substituents are converted to $OCH_2CH_2CONH_2$ or $OCH_2CH_2COOR$ radicals wherein R represents such radicals as H, Na, K, $NH_4$, and alkyl, e.g., $CH_3$, $C_2H_5$, etc. and Ac represents acetyl radicals.

The N-containing resins include the cationic, anionic and nonionic resins which are made from urea, melamine or mixtures thereof reacted with formaldehyde and are well known in the art. In general, they are the low molecular weight, water-dispersible or water-soluble, reaction products of formaldehyde with urea, melamine or mixtures thereof.

The polymerization products employed in the present invention can be produced by mixing an above-mentioned polysaccharide or polysaccharide derivative in suitable proportions with an above-mentioned nitrogen-containing resin, and heating the resulting mixture at 20°–130° C. for 10 min. to 5 hrs. to react the resin with the polysaccharide or the substituted polysaccharide. Illustrative proportions of reactants which are suitable for producing the polymerization products of this invention are ½ to ⅒ parts of the nitrogen-containing resin per part of substituted or unsubstituted polysaccharide.

The polymerization products thus prepared dissolve more readily in water than heretofore-known coagulants. These polymerization products act effectively on aqueous suspensions of a wide range of pH and temperature. These products are capable of accelerating the coagulation of the minute particles suspended in water and possessed remarkably increased coagulating effects when employed jointly with inorganic salts, synergism being clearly recognizable.

The inorganic salts employed in the present invention include any water-soluble inorganic salts having such cations as $H^+$, $Ag^+$, $Hg_2^{++}$, $Pb^{++}$, $Hg^{++}$, $Ca^{++}$, $Bi^{+++}$, $Cu^{++}$, $As^{+++}$, $As^{+++++}$, $Sb^{+++}$, $Sb^{+++++}$, $Sn^{++}$, $Sn^{++++}$, $Fe^{+++}$, $Al^{+++}$, $Cr^{+++}$, $Mn^{++}$, $Zn^{++}$, $Co^{++}$, $Ni^{++}$, $Cd^{++}$, $Sr^{++}$, $Ba^{++}$, $Mg^{++}$, $Na^+$, $K^+$, $NH_4^+$ and such anions as $OH^-$, $SO_4^{--}$, $SiF_6^{--}$, $C_2O_4^{--}$, $F^-$, $Cr_2O_7^{--}$, $SO_3^{--}$, $S_2O_3^{--}$, $CrO_4^{--}$, $PO_4^{---}$, $AsO_4^{---}$, $AsO_3^{---}$, $SiO_3^{--}$, $BO_2^-$, $CO_3^{--}$, $C_4H_4O_6^{--}$, $Cl^-$, $Br^-$, $CN^-$, $Fe(CN)_6^{----}$, $Fe(CN)_6^{---}$, $ClO^-$, $SCN^-$, $S^{--}$, $NO_3^-$, $NO_2^-$, $ClO_3^-$, $CH_3COO^-$. Illustrative inorganice salts include sodium chloride, barium chloride, calcium chloride, aluminum sulfate, sodium sulfate, sodium phosphate, potassium chloride, potassium sulfate, sodium borate, sodium silicate, and the like.

The amount of polymerization product employed in the treatment of aqueous suspensions varies somewhat depending upon (1) the degree of minuteness and chemical and physical properties of the suspended particles to be separated and coagulated, (2) the desired coagulating velocity, (3) the treating temperature, (4) the pH of the suspension, (5) the type of substituted or unsubstituted polysaccharide employed in making the polymerization product used, (6) the type of nitrogen-containing resin in making the polymerization product, (7) the respective proportions of reactants used in making the polymerization product, (8) the degree of polymerization, etc. However, in general, from 2 g. to 1 kg. of the polymerization product per ton of suspended particles is employed and the amount of inorganic salt to be jointly used is usually greater than this amount of the resin, e.g., from 2 g. to 40 kg. per ton of suspended particles.

The present invention with its broad field of application has great significance economically, such as, an improvement in the recovery of pulp and clay which flow out as stable suspended matter in the white water from paper making machines; an improved means of coagulating, separating and recovering mineral matters suspended in water discharged in the mining, metallurgical and manufacturing industries, which mineral matters otherwise are slow to coagulate or do not coagulate at all; an improved means of purifying polluted city water; an improved means of soil conditioning, etc.

The following examples are illustrative of the present invention. However, since many widely differing embodiments of this invention will be obvious without departing from the spirit and scope thereof, it is to be understood that we do not limit ourselves to the specific embodiments set forth herein except as defined in the appended claims. All percentages and parts are based on weight unless otherwise specified.

*Example 1*

A 25% aqueous solution was prepared wherein 13.9% of the OH groups of oxidized starch were substituted by $OCH_2OH$ groups. To 9 parts of said solution was added 1 part of a 40% aqueous resin solution of a water-soluble, cationic ureaformaldehyde resin. The pH value of the resulting solution was adjusted to 5.0 with dilute hydrochloric acid and heated at 60° C. for 45 min., resulting in a viscous liquid product having a viscosity of about 5 poises.

The coagulation and sedimentation of particles suspended in water after standing 5 minutes following the addition of inorganic salts and/or said viscous liquid product was noted and compared in each of the following 3 cases.

(1) This liquid was diluted so as to reduce its solids content to 0.01% and was added alone to an aqueous suspension having suspended therein 7% coal dust passable through a 200 mesh screen. (2) An inorganic salt was added alone to said aqueous suspension. (3) Said viscous liquid and inorganic salt were jointly added to said aqueous suspension. Observations of coagulation and sedimentation in each case are set forth in Table I.

The amount of chemical added is based on the weight of the suspended particles. Such suspended coal dusts in many cases do not precipitate substantially without a coagulant even after standing for many hours.

TABLE I

| Test No. | Chemical Added | Observations of Coagulation and Sedimentation |
|---|---|---|
| (1)a | Sodium chloride, 1%. | Substantially no change was recognizable. |
| (1)b | Sodium chloride, 4%. | |
| (1)c | Aluminum sulfate 1%. | |
| (1)d | Aluminum sulfate 4%. | |
| (2)a | Product, 5 p.p.m. | Sedimentation velocity 30mm./min. Supernatant liquid was opaque. |
| (2)b | Product, 10 p.p.m. | Sedimentation velocity 42mm./min. Supernatant liquid was opaque. |
| (3)a | Sodium chloride, 1% and product, 5 p.p.m. | Sedimentation velocity 34mm./min. Supernatant liquid was clear and transparent. |
| (3)b | Sodium chloride, 4% and product, 5 p.p.m. | Sedimentation velocity 34mm./min. Supernatant liquid was clear and transparent. |
| (3)c | Sodium chloride, 4% and product, 10 p.p.m. | Sedimentation velocity 45mm./min. Supernatant liquid was clear and transparent. |
| (3)d | Aluminum sulfate, 1% and product, 5 p.p.m. | Sedimentation velocity 20mm./min. Supernatant liquid was clear and transparent. |
| (3)e | Aluminum sulfate, 4% and product, 10 p.p.m. | Sedimentation velocity 42mm./min. Supernatant liquid was clear and transparent. |

As shown in the above example, the addition of just an inorganic salt resulted in substantially no recognizable changes. In the case of addition of the liquid product alone, minute particles did not substantially coagulate and as a result the supernatant liquid remained opaque. When the inorganic salts were employed in combination with the liquid product, however, almost all of the particles coagulated and precipitated, producing a clear supernatant liquid, thus illustrating synergistic effects. The sedimentation velocity in the case of the addition of the liquid product alone refers to the sedimentation velocity of comparatively large particles only while the sedimentation velocity in the case of the addition of the inorganic salts in combination with the liquid product refers to the sedimentation velocity of substantially all suspended particles. The concentration of particles in the supernatant liquid in the cases described as "opaque" and "transparent" were about 0.4% and about 0.15%, respectively.

Example 2

The product prepared in Example 1 from the modified oxidized starch and the cationic urea-formaldehyde resin was employed in combination with ferric chloride. The results are shown below in Table II wherein an aqueous suspension of 5% coal dust passing through a 200 mesh screen was treated.

TABLE II

| Test No. | Amount of product used (p.p.m.) | Amount of ferric chloride used (p.p.m.) | Clarity (percent light transmission) |
|---|---|---|---|
| 1 | 0 | 50 | 0 |
| 2 | 0 | 100 | 7.5 |
| 3 | 0 | 200 | 60.0 |
| 4 | 5 | 0 | 1.5 |
| 5 | 40 | 0 | 6.0 |
| 6 | 5 | 50 | 7.0 |
| 7 | 5 | 100 | 52.0 |
| 8 | 5 | 200 | 79.5 |
| 9 | 40 | 200 | 90.0 |

In this series of tests the amount of light transmitted through the supernatant liquids of the treated suspensions was compared against the standard of the amount of light (from the same intensity source) transmitted through pure water taken as 100% transmission.

Example 3

A polymerization product was prepared by mixing 5.6 parts of the starch from potato with 1 part of an anionic urea-formaldehyde resin and heating the resulting mixture at 60° C. for 45 min. The resulting product was a viscous liquid having a viscosity of 4 poises.

A remarkable clarification effect was noticed when this polymerization product was added to samples of industrial waste water having a pH value of 9.5 and containing about 0.2% of $Fe_2O_3$ and about 0.1% total amount of inorganic substances such as $Al_2O_3$, MgO, CaO, Hg, Mn, Pb, Cu, Se, Ti, As, Cl, etc. The method used in the tests was as follows. Samples of the industrial waste water were put into beakers and the latter were placed in a row. Into some of the beakers the polymerization product was added. Coagulation observations were made by using a jar tester. In regard to the samples to which the polymerization product had been added, coagulation was clearly observed and clarification was attained in a few minutes. Amounts of the polymerization product of about 0.5–1 p.p.m. were sufficient to provide substantially complete clarification.

Example 4

Tests were conducted on removing turbidity from water suspensions by employing a polymerization product as set forth in Example 1. A suspension made by diluting kaolin with water and having a turbidity adjusted to 1000° was used as the original water. The method of the tests was as follows. The above-mentioned suspension was put into beakers to which necessary amounts of aluminum sulfate and the polymerization product were added. The pH values of the resulting mixtures were brought to 6–7, slow agitation was applied by a jar tester for 30 minutes and the mixture was allowed to stand for 5 minutes. The supernatant liquid of the mixture was withdrawn and the percent transmission was obtained by employing a photoelectric photometer. Employing the calibration curve, the degree of turbidity was obtained from the percent transmission values and respective clarifications were compared as set forth in Table III.

TABLE III

| No addition of inorganic salt or product | | Percent transmission, 17.0 | Degree of turbidity, 926 | pH, 6.7 |
|---|---|---|---|---|
| Addition amount of aluminum sulfate, p.p.m. | Addition amount of product, p.p.m. | | | |
| 10 | 0.5 | 98.6 | 4 | 6.0–6.1 |
| 10 | 0.75 | 100.0 | <1 | 6.0–6.1 |
| 10 | 1 | 98.8 | 3 | 6.0–6.1 |
| 20 | 0.25 | 98.5 | 5 | 6.8–6.9 |
| 20 | 0.50 | 100.0 | <1 | 6.8–6.9 |
| 20 | 0.75 | 100.0 | <1 | 6.8–6.9 |
| 20 | 1.0 | 100.0 | <1 | 6.8–6.9 |
| 10 | 0 | 79.6 | 82 | 6.2 |
| 20 | 0 | 82.6 | 69 | 6.7 |
| 60 | 0 | 100.0 | <1 | 6.0 |
| 60 | 0 | 98.0 | 6 | 7.0 |

It will be seen from the above-mentioned results that, when the polymerization product is jointly used, the amount of aluminum sulfate employed can be decreased by ⅓ to ⅙ that amount of aluminum sulfate, when used alone, to provide equivalent clarification. By the joint use of aluminum sulfate and polymerization product it is also possible to form flocs of greater size and the sedimentation velocity is faster than the case wherein aluminum sulfate is used alone.

This process can be utilized in the treatment of service water and in the removal of turbidity from industrial water. In these cases the present invention has a great economic advantage in that considerable reductions can be realized in the expense heretofore spent for such chemicals as aluminum sulfate.

Example 5

In some coal mines minute coal dusts, after a flotation process, are recovered by an Oliver filter. In these filtrating processes, it occasionally happens that minute coal dusts plug the meshes of the filter and stop the water from passing through the meshes of the filter due to the particular properties of the coal dusts or the water used in the treatment.

Under such circumstances the use of a coagulant proves to be effective in preventing these difficulties. A test follows wherein a polymerization product of an oxidized starch and a nonionic urea-melamine-formaldehyde resin is employed together with aluminum sulfate as a filtration aid. The polymerization product was prepared by mixing 8.4 parts of the oxidized starch with 1 part of a water-soluble nonionic urea-melamine-formaldehyde resin (having 5 parts urea per part of melamine) and heating the resulting mixture at 75° C. for 20 min. The resulting product was a viscous liquid having a viscosity of 0.8 poise.

The method the experiment was as follows. A suspension was prepared containing 10% of minute coal dusts passable through a 200 mesh screen. Filtration was conducted at a constant vacuum of 150 mm. Hg for four minutes by immersing upside down in this suspension a Büchner funnel to which had been attached No. 4 filter paper made by Toyo Filter Paper Manufacturing Co., Inc. while agitating said suspension in a beaker. The amounts of dried cake produced were compared.

TABLE IV

| Addition amount (per ton of minute coal dusts) | Amount of dried cake (g.) | | | |
|---|---|---|---|---|
| | Aluminum sulfate | Product | Joint employment of aluminum sulfate and product* | No addition |
| Aluminum sulfate, 278 g.; Product, 1.92 g. | 7 | 11.8 | 13.2 | |
| Aluminum sulfate, 1,112 g.; Product, 7.68 g. | 13.4 | 13.7 | 15.3 | 5.7 |
| Aluminum sulfate, 4,448 g.; Product, 30.72 g. | 15.3 | 15.5 | 16.6 | |

* The addition amounts of aluminum sulfate and product respectively in the addition amount columns of Table IV means those of single employment, while those of joint employment are represented by:

Amount of aluminum sulfate×⅔+amount of product×⅓

Example 6

Digging of the sea-bottom and reclamation of the harbor are being conducted in the Bay of Osaka. Since the sea-water suspended with earth and sand contains a lot of inorganic salt the sea-water per se shows a fairly rapid sedimentation velocity. But when the polymerization product as set forth in Example 1 was added the sedimentation velocity accelerated still further. The results are shown below.

TABLE V

| Sedimentation time (min.) | Sedimentation distance (cm.) | |
|---|---|---|
| | Blank | Product |
| 0 | 0 | 0 |
| 2 | 0.6 | 0.5 |
| 4 | 2.0 | 5.3 |
| 6 | 4.0 | 8.5 |
| 8 | 5.9 | 10.0 |
| 10 | 7.2 | 11.0 |

96 g. of the product were added per ton of earth and sand in aqueous suspension. The total concentration of the earth and sand was 5%, and the product was added after diluting its concentration to 0.01%.

Example 7

As an example of the treatment of a non-metal mineral the following experiment was carried out. Sulfur ore (grade, 26% S) of low grade pulverized to less than 200 mesh was suspended in water and the concentration of the suspension was adjusted to 5%. After allowing this suspension to stand for 1 hour, the effects on the acceleration of filtration were measured by adding the polymerization product prepared as follows: 4.5 parts of the oxidized starch and 1 part of a water-soluble, cationic melamine-formaldehyde resin were mixed and heated at 65° C. for 30 min. The resulting product was a viscous liquid having a viscosity of 0.5 poise. The results are shown in Table VI.

The method of the test was as follows. 100 cc. of a suspension sample were placed in a Büchner funnel having an inner diameter of 50 mm. and provided with a piece of filter paper No. 5B made by Toyo Filter Paper Manufacturing Co., Inc. The suspension was filtered at a constant vacuum of 660 mm. Hg. The filtration time and the amount of the filtrate were measured. In cases where a coagulant is employed, a suitable amount of the coagulant is added to the suspension prior to the filtration, the suspension in a suitable vessel is gently turned upside down ten times and coagulation is completed.

Measurement of filtration velocity was initiated at the time when the amount of the filtrate reached 20 cc., and the following table shows overall average filtration velocity until the amount of the filtrate attained 80 cc.

TABLE VI

| Amount of product employed, mg./l. | Amount of $BaCl_2 \cdot 2H_2O$ employed, mg./l. | Filtration velocity, cc./cm.$^2$/min. |
|---|---|---|
| 0 | 0 | 0.5 |
| 2 | 0 | 0.5 |
| 4 | 0 | 0.6 |
| 6 | 0 | 0.6 |
| 8 | 0 | 0.7 |
| 10 | 0 | 0.7 |
| 0 | 200 | 0.8 |
| 2 | 200 | 1.0 |
| 4 | 200 | 1.3 |
| 6 | 200 | 1.4 |
| 8 | 200 | 1.4 |
| 10 | 200 | 1.5 |
| 0 | 400 | 1.4 |
| 5 | 400 | 1.9 |
| 10 | 400 | 2.3 |
| 15 | 400 | 2.6 |
| 20 | 400 | 2.6 |
| 0 | 800 | 1.7 |
| 5 | 800 | 3.8 |
| 10 | 800 | 4.3 |
| 0 | 1,000 | 2.0 |
| 0 | 2,000 | 2.4 |
| 0 | 3,000 | 2.5 |
| 0 | 4,000 | 2.6 |

It is understood from the aforementioned table that in case 4000 mg./l. of $BaCl_2 \cdot 2H_2O$ alone is used, filtration velocity is 2.6 cc./cm.$^2$/min., and in case 10 mg./l. of the product alone is used, the velocity is 0.7 cc./cm.$^2$/min. When 800 mg./l. of $BaCl_2 \cdot 2H_2O$ is employed together with 5 mg./l. of the product, however, the filtration velocity attains 3.8 cc./cm.$^2$/min., showing that a remarkable acceleration in coagulation of minute particles is possible by the joint employment.

The terms "part" and "parts" used in the present application represent part by weight and parts by weight respectively.

What is claimed is:

1. Process for coagulating the suspended minute particles of an aqueous suspension comprising adding to said suspension (1) the reaction product of a compound from the closs consisting of substituted and unsubstituted polysaccharides and an N-containing resin from the class consisting of urea-formaldehyde resins, melamine-formaldehyde resins and mixtures thereof, and (2) an inorganic salt in respective amounts sufficient to coagulate said particles.

2. The process as claimed in claim 1 wherein said reaction product is prepared from an oxidized starch containing methyloloxy substituents and a cationic urea-formaldehyde resin.

3. The process as claimed in claim 2 wherein said inorganic salt is sodium chloride.

4. The process as claimed in claim 2 wherein said inorganic salt is aluminum sulfate.

5. The process as claimed in claim 2 wherein said inorganic salt is ferric chloride.

6. The process as claimed in claim 1 wherein said reaction product is made from an oxidized starch and a nonionic urea-melamine-formaldehyde resin.

7. The process as claimed in claim 6 wherein said inorganic salt is aluminum sulfate.

8. Process for coagulating the suspended minute particles of an aqueous suspension comprising adding to said suspension (1) the reaction product of oxidized starch and a cationic melamine-formaldehyde resin, and (2) barium chloride in respective amounts sufficient to coagulate said particles.

9. A composition of matter comprising an aqueous solution of sodium chloride and the reaction product of a urea-formaldehyde resin and an oxidized starch wherein at least 4% of the —OH radicals of the starch is replaced with —OCH$_2$CH$_2$CN or —OCH$_2$CH$_2$CONH$_2$ radicals and at least 1% of the replacing radicals is further converted, said —OCH$_2$CH$_2$CN radicals being converted to $$-OCH_2CH_2CONH_2$$

or —OCH$_2$CH$_2$COOR radicals and said $$-OCH_2CH_2CONH_2$$

radicals being converted to —OCH$_2$CH$_2$COOR radicals, wherein R is a member selected from the group consisting of a lower alkyl radical and a cation of an inorganic water-soluble salt.

10. A composition of matter comprising an aqueous solution of aluminum sulfate and the reaction product of a urea-formaldehyde resin and an oxidized starch wherein at least 4% of the —OH radicals of the starch is replaced with —OCH$_2$CH$_2$CN or —OCH$_2$CH$_2$CONH$_2$ radicals and at least 1% of the replacing radicals is further converted, said —OCH$_2$CH$_2$CN radicals being converted to $$-OCH_2CH_2CONH_2$$

or —OCH$_2$CH$_2$COOR radicals and said $$-OCH_2CH_2CONH_2$$

radicals being converted to —OCH$_2$CH$_2$COOR radicals, wherein R is a member selected from the group consisting of a lower alkyl radical and a cation of an inorganic water-soluble salt.

11. Process for coagulating the suspended minute inorganic particles of an aqueous suspension comprising adding to said suspension the reaction product of, as sole active ingredients, an oxidized starch containing methyloloxy substituents and an anionic urea-formaldehyde resin in an amount sufficient to coagulate said particles.

References Cited by the Examiner

UNITED STATES PATENTS

| | | | |
|---|---|---|---|
| 2,385,438 | 9/1945 | Fowler et al. | 162—166 X |
| 2,400,820 | 5/1946 | Glarum et al. | 127—32 X |
| 2,582,840 | 1/1952 | Maxwell. | |
| 2,728,724 | 12/1955 | Gloor | 210—54 X |
| 2,938,026 | 5/1960 | Stephens et al. | 260—233.3 |
| 2,975,124 | 3/1961 | Caldwell et al. | 210—54 |
| 2,981,630 | 4/1961 | Rowland | 210—54 X |
| 2,998,344 | 8/1961 | Carlson | 162—166 X |
| 3,009,889 | 11/1961 | Borchert | 260—17.3 |
| 3,082,173 | 3/1963 | Horvitz | 210—54 X |

OTHER REFERENCES

Stein: Water Purification Plants and Their Operation, Third edition, 1926, pp. 162 and 163 relied on.

MORRIS O. WOLK, *Primary Examiner.*

M. E. ROGERS, *Assistant Examiner.*